May 6, 1952 F. H. McCORMICK 2,596,039
POWER-OPERATED CONTROL
Filed May 24, 1949
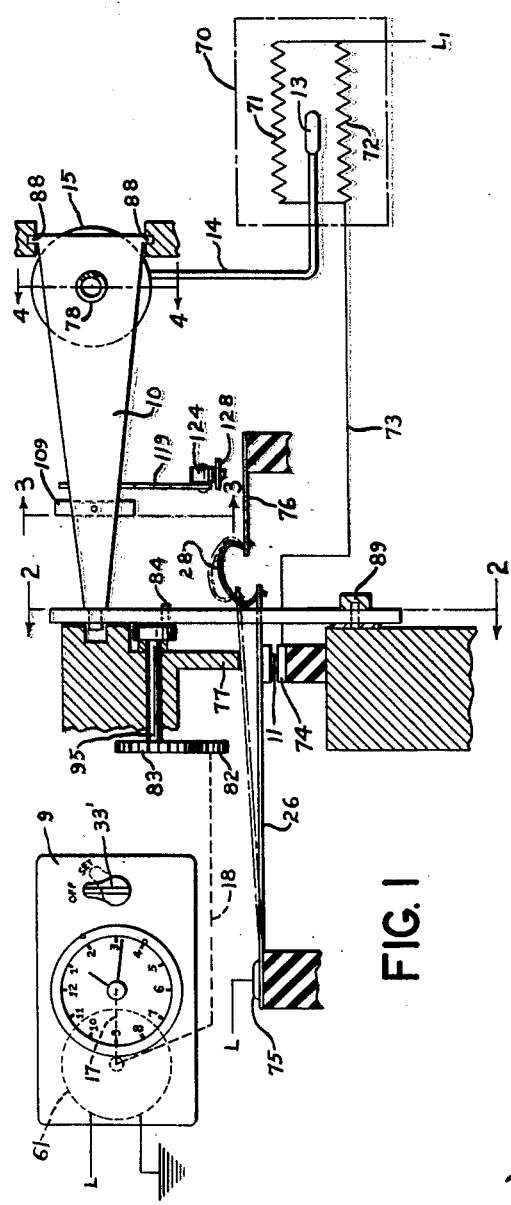
INVENTOR.
Francis H. McCormick
BY
Spencer Hardman and Fehr
attorneys

Patented May 6, 1952

2,596,039

UNITED STATES PATENT OFFICE 2,596,039

POWER-OPERATED CONTROL

Francis H. McCormick, Oakwood, Ohio, assignor to General Motors Corporation, Dayton, Ohio, a corporation of Delaware Application May 24, 1949, Serial No. 94,973

8 Claims. (Cl. 161—1)

This invention relates to domestic appliances, and more particularly to controls for electric ranges, or the like.

A specific embodiment of this invention utilizes the timer motor of an electric range, or the like, to multiply the small movement produced by the diaphragm of a liquid-filled thermostat.

In a broader aspect of this invention, the control arrangement includes a thermostat which mechanically controls the mechanical connection of a power means with the switch or other control device in such a way that the power means operates the switch or control device from either position to the other and then disconnects itself.

The power means may be in the form of a clock timer which also makes effective and ineffective the control by the thermostat at different pre-selected times.

It is an object of my invention to provide a simple, inexpensive control arrangement in which a temperature sensitive device mechanically controls the connection of a power means with a control device.

It is another object of my invention to relieve the load upon the temperature sensitive elements in control devices of this type and to reduce the amount of expansion of the temperature sensitive elements required to operate the control device from one position to another.

It is another object of my invention to use the power available from a clock timer for operating a control device under the control of a temperature sensitive element.

It is another object of my invention to arrange for the clock timer to control the same control device which is otherwise controlled by the temperature sensitive element.

Further objects and advantages of the present invention will be apparent from the following description, reference being had to the accompanying drawings, wherein a preferred form of the present invention is clearly shown.

In the drawings:

Fig. 1 is a diagrammatic view, partly in section of a control arrangement for an electric oven;

Fig. 2 is a fragmentary sectional view taken substantially along the line 2—2 of Fig. 1;

Fig. 3 is a fragmentary sectional view, partly diagrammatic, taken along the line 3—3 of Fig. 1; and Fig. 4 is a fragmentary sectional view taken substantially along the line 4—4 of Fig. 1.

By way of example, this invention is shown as used in connection with a timer disclosed in the Gallagher patent 2,301,942, granted November 17, 1942, although it is to be understood that other timers may be used in lieu thereof. As one form of the invention, the timer may be exactly as disclosed in this patent with the exception that the switch actuating cam 121 of the patent need be provided only with two lobes 121' and 121". As in said Patent 2,301,942, the position of the cam 121 is controlled by the stop plate 119 having a roller 124 adapted to engage the spring detent 128. The stop plate 119 also has stop shoulders 122, 123 adapted to engage the timer controlled tripping lever 107. The lobes 121' and 121" through a pad 109 actuate a primary lever 10 instead of the contact spring 131' disclosed in the patent. Neither of the contact springs 131 or 131' or their accompanying switches shown in the patent, are to be used with the timer disclosed herein.

Referring now more particularly to Fig. 1, there is shown diagrammatically an electric oven 70 provided with electric heating units 71 and 72 which are connected at one end to the supply conductor $L_1$. The other ends of the electric heating units 71, 72 are connected by the conductor 73 with a stationary contact 74 which, together with the movable contact 11, forms the main switch of the oven 70. The movable contact 11 is mounted upon the movable end of a cantilever type leaf spring 26 which is anchored to an anchorage 75 which in turn is connected to the supply conductor L to complete the circuit. The leaf spring 26 is pivotally connected to a toggle spring 28 which in turn is pivotally connected to an anchoring member 76. This arrangement causes the switch movable contacts 11 to be moved to and from the closed position with a snap action. In the open position, as illustrated by the dot-dash lines, the leaf spring 26 lies against the stop 77.

If desired, both lines L and $L_1$ may be opened by the switch structure 26, 11, which, in that case, may be of the double pole variety, as is obvious.

Where such snap-acting type of controls are required to operate over a wide range of pressure or temperature, great difficulties are encountered because it is necessary to select an operating medium which will have substantially uniform characteristics and not too great expansion over the wide ranges of temperatures desired. This is particularly true of thermostat constructions utilizing a liquid remaining in liquid state substantially throughout all operating temperatures. In the past, designers have resorted to pilot relay systems or mechanical systems in which the thermo sensitive elements act through a great multiplication to provide the required movement to operate the snap-acting control device. Such control arrangements are relatively expensive.

According to my invention, the thermosensitive element 13 is mounted within the oven compartments 70 and connected by a capillary tube 14 with a flat diaphragm member 15 which is often called a diostat. The bulb 13, the capillary tube 14, and the diostat 15 preferably contain a liquid remaining substantially completely in liquid form throughout the range of temperatures of the oven 70. The diostat 15 expands and contracts in accordance with the temperature of the bulb 13. The diostat 15 is provided with a conically pointed follower 16 against which is held a simple lever 10 under the continuous force of a spring 78. While the bulb 13, tube 14 and diostat 15, preferably contain liquid which does not volatilize within operating temperatures, many of the advantages of this invention may be obtained with a substance that is volatile during operating temperatures. Hence the use of such substance is within the purview of this invention.

To obtain a range of temperatures, the diostat 15 is mounted upon an adjustable screw 79 which is slidably but not rotatably mounted in a bracket 80. A key and key-way are used to prevent rotation of the screw 79. The screw 79 is threaded into an adjustable knob 12 having a shoulder 81 which serves as a bearing to take up the thrust provided by the spring 78.

Instead of using the lever 10 to operate the leaf spring 26 directly or through the medium of a secondary lever, I provide a power means having a portion which is power-operated in opposite directions either continuously or at frequent intervals. According to this invention the clock timer 9 is constructed similar to the timer disclosed in the Gallagher Patent 2,301,942 with the exceptions herein noted. This timer includes an electric synchronous rotary timer motor 61 which through a drive means 17 operates the clock mechanism. It also has shaft means 18, shown diagrammatically, which through a pinion 82 and a gear 83 operates an eccentrically mounted pin 84 at the opposite end of the shaft 95. The pin 84 extends into a transverse slot 85 providing a Scotch yoke type of reciprocating drive between the shaft 95 and an operating member 86.

The guiding of the upper end of the operating member 86 is accomplished by a vertical slot 87 into which extends the extreme end portion of the lever 10. Thus this free end portion of the primary lever 10 guides as well as laterally moves the upper end of the operating member 86. The movement of this end of the lever 10 is amplified since it is farther from the pivot means 88 than the conically pointed follower 76 of the diostat 15. At the lower end, the operating member 86 is guided by a fixed pin 89 provided with a head for keeping the operating member 86 from leaving the pin. By virtue of this arrangement the operating member is moved up and down by the shaft 18 of the clock timer 9. In addition to this continuous reciprocation, it can also pivot on the pin 89 in accordance with the movement of the lever 10 which corresponds to the temperature of the bulb 13, as modified by the adjustment of the knob 12. The operating member 86 includes a downwardly facing engaging shoulder 90 and an upwardly facing engaging shoulder 91.

When the switch mechanism 26 is in the proper position according to the temperature of the thermostat bulb 13 and the adjustment of the knob 12, the operating member 86 will be substantially in the position of Fig. 2 and will make a complete reciprocation for every revolution of the eccentric shaft 95. When the switch is closed, as shown in Fig. 1, the electric heating units 71 and 72 will be energized thereby increasing the temperature within the oven 70 and increasing the temperature of the bulb 13. This will cause the diostat 15 to expand and to move the lever 10 so that the upper portion of the operating member 86 will be gradually moved to the left as shown in Fig. 2. When this upper portion of the operating member 86 is moved far enough, the shoulder 91, upon the upward movement of the operating member 86, will engage the leaf spring 26 and lift it to the dot and dash line position thereby opening the contacts 11—74 to deenergize the electric heating means 71, 72. In the open circuit position of the leaf spring 26, the shoulder 91 cannot contact the leaf spring 26, since the amount of reciprocation is designed so as to be sufficient to carry the leaf spring 26 across the dead-center position but the reciprocation stops short of causing the shoulder 91 to engage the leaf spring 26 in the open circuit (dot-dash line) position.

The deenergization of the electric heaters 71 and 72 will cause the temperature of the oven 70 to be reduced as well as the temperature of the bulb 13. This will cause the free end of the lever 10 to be moved to the right, as shown in Fig. 2, thereby moving the upper end of the operating member 86 to the right, as shown in Fig. 2, while the reciprocation of the operating member 86 continues under the power of the clock motor 61. When the temperature has been reduced sufficiently the operating member 86 will be moved sufficiently far to the right to cause the shoulder 90 to engage the leaf spring 26 and move it back to the closed circuit position, shown in Figs. 1 and 2 in full lines.

As a further feature of my invention, the clock timer mechanism also operates through the lever 10 and the operating member 86 to control the leaf spring 26 and the contacts 11 and 74. As in the Gallagher Patent 2,301,942, the clock timer is provided with a control knob 33 shown in full lines in the "off" position. In the "off" position, the clock timer does not interfere with the control of the leaf spring 26 and the contacts 11 and 74 by the bulb 13, the diostat 15 and the main lever 10.

When it is desired to use the clock to control the heating of the oven, the control knob 33' is moved from the "off" position to the "set" position. In the "set" position, the cam lobe 121' engages the pad 109 to lift the lever 10 off the conically pointed follower 16 of the diostat 15 so that the thermostatic system is no longer in the control. This movement of the main lever 10 moves the upper portion of the operating member 86 to the left as shown in Fig. 2 so that the shoulder 91 in its normal reciprocation will engage the leaf spring 26 and move it to the open circuit position. The leaf spring 26 will remain in the open circuit position until it is time for the heating period to begin. According to Fig. 1, the clock timer 9 shows a time of 1:16 and the timer is set to begin a cooking period at 2:00 p. m.

and to end the cooking period at 4:00 p. m. If at the time of 1:16 the control knob 33' is moved to the "set" position the leaf spring 26 will then be moved to the "off" position as mentioned before.

The controls will remain thus until 2:00 p. m. at which time the cam 121 will be rotated, as set forth in the Gallagher Patent 2,301,942, so that the pad 109 is between the two lobes 121' and 121'' thus permiting the bulb 13, the diostat 15 and the lever 10 to effectively actuate the operating member 86 according to the temperature of the oven 70 and the setting of the knob 12. This will cause the leaf spring 26 to be moved to the closed position and then cycled according to the temperature of the oven 70 to keep the oven at the temperature set by the knob 12 throughout the heating period until the time selected for the termination of the heating period, for example 4:00 p. m.

At this time the cam 121 will again be released to move the lobe 121'' into engagement with the pad 109 to lift the lever 10 away from the conically pointed follower 16 to move the operating member 86 to the left thereby causing the shoulder 91 to engage the leaf spring 26 to move it to the open circuit position to terminate the cooking period. To restore the circuit to normal thermostatic control, the knob 33' is returned to the "off" position and at the same time the knob 12 is turned to the "off" position. By using the power of the clock motor to operate the snap-acting switch mechanism, a more powerful toggle spring 28 may be used thereby insuring greater contact pressure and better snap action characteristics. This will minimize contact difficulty.

While the form of embodiment of the invention as herein disclosed constitutes a preferred form, it is to be understood that other forms might be adopted, as may come within the scope of the claims which follow.

What is claimed is as follows:

1. A control arrangement including a snap-acting control device movable between two control positions, a timing means provided with an engaging portion including a plurality of movable engaging shoulders movable coincidentally to the operation of the timing means, thermostatic means for moving said engaging portion relative to a portion of the control device to cause engagement of said engaging shoulders with said portion of the control device to move the control device from one position to another under the power supplied by the timing means, and means responsive to a predetermined operation of said timing means for moving said control device from one position to another independently of said thermostatic means.

2. A control arrangement including a snap-acting control device movable between two control positions, an operating member for said control device, guide means at two spaced locations upon said operating member, reciprocating means for reciprocating said operating member upon said guide means, temperature responsive means for moving one portion of said guide means laterally relative to the direction of reciprocations, said operating member being provided with an engaging shoulder for engaging a portion of said control device to move the control device from one position to another, a timing means for operating said reciprocating means, said timing means also including selective means for operating said control device from one position to another independently of said temperature responsive means.

3. An arrangement comprising: a timer having a timer motor and movable start and stop means; a switch having open and closed positions; an actuator reciprocated by said timer motor and having opening and closing shoulders adapted to engage said switch to move it back and forth between open and closed positions; a thermostat moving said actuator laterally to select the engagement of said shoulders with said switch; and means to cause said movable start and stop means to move said actuator laterally independently of said thermostat.

4. An arrangement comprising: a motor; a control device having on and off positions; an actuator reciprocated by said motor and having on and off shoulders adapted to engage said control device to move it back and forth between on and off positions; and a thermostat moving said actuator laterally to select the engagement of said shoulders with said control device.

5. An arrangement comprising: a motor; a switch having on and off positions; an actuator reciprocated by said motor and having on and off shoulders adapted to engage said switch to move it back and forth between on and off positions; and a thermostat moving said actuator laterally to select the engagement of said shoulders with said switch.

6. A control arrangement including a control device having two alternate fixed control positions, holding means for normally holding said control device in either of said two positions, a power driven actuator having alternate connecting means with said control device for overcoming said holding means and positively moving said control device from either of said control positions toward the alternate control position, thermostatic means provided with an operative controlling connection with said connecting means for controlling said connecting means to positively move said control device from either of said control positions toward the alternate control position, and means controlled by said actuator for disconnecting said operative controlling connection between said thermostatic means and said connecting means.

7. A control arrangement including a control device having two alternate fixed control positions, holding means for normally holding said control device in either of said two positions, a power driven actuator having alternate connecting means with said control device for overcoming said holding means and positively moving said control device from either of said control positions toward the alternate control position, thermostatic means provided with an operative controlling connection with said connecting means for controlling said connecting means to positively move said control device from either of said control positions toward the alternate control position, and selective means controlled by said actuator and responsive to a selected operation of said actuator for disconnecting said operative controlling connection between said thermostatic means and said connecting means and responsive to a second selected operation of said actuator for reconnecting said operative controlling connection.

8. A control arrangement including a control device having two alternate fixed control positions, holding means for normally holding said control device in either of said two positions, a clock timer, an actuator driven by said clock timer having alternate connecting means with said control device for overcoming said holding means and positively moving said control device from either of said control positions toward the alternate control position, thermostatic means provided with an operative controlling connection with said connecting means for controlling said connecting means to positively move said control device from either of said control positions toward the alternate control position, said clock timer being provided with preselective settable means effective at a selected clock time for disconnecting said operative controlling connection between said thermostatic means and said connecting means.

FRANCIS H. McCORMICK.

REFERENCES CITED

The following references are of record in the file of this patent:

UNITED STATES PATENTS

| Number | Name | Date |
| --- | --- | --- |
| 1,669,582 | Staege | May 15, 1928 |
| 1,745,420 | Hewitt | Feb. 4, 1930 |
| 1,845,278 | Igou | Feb. 16, 1932 |
| 1,976,843 | Eskin | Oct. 16, 1934 |
| 2,006,152 | Spencer | June 25, 1935 |
| 2,174,558 | Gunther | Oct. 3, 1939 |
| 2,346,694 | Maris | Apr. 18, 1944 |
| 2,347,344 | Waidelich | Apr. 25, 1944 |
| 2,376,664 | Crise | May 22, 1945 |
| 2,384,373 | Harris | Sept. 4, 1945 |
| 2,416,084 | Candor | Feb. 18, 1947 |
| 2,439,842 | Clark | Apr. 20, 1948 |